Jan. 15, 1963 E. NASSOUR 3,073,053
METHOD OF AND MEANS FOR MAKING PLASTIC FIGURES
HAVING DIFFERENT POSTURES OF ANIMATION
Filed Aug. 17, 1959 2 Sheets-Sheet 1
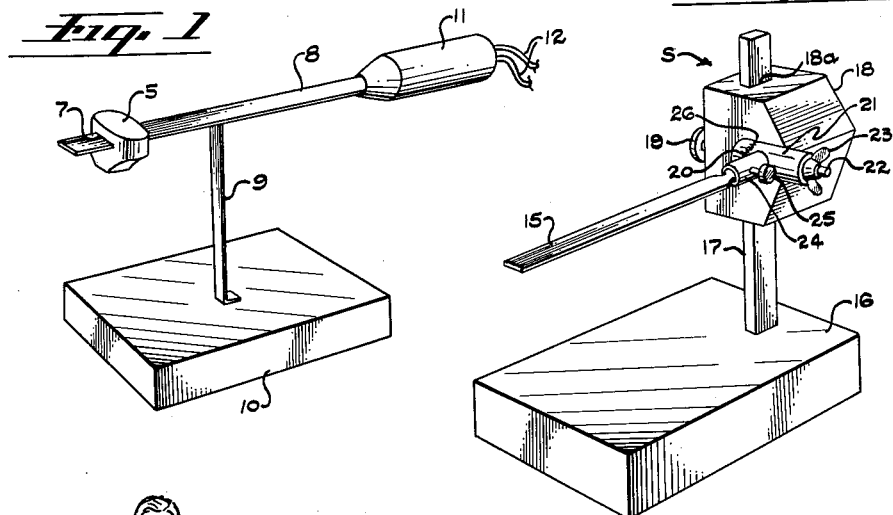
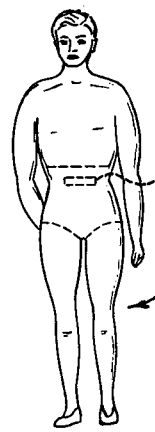
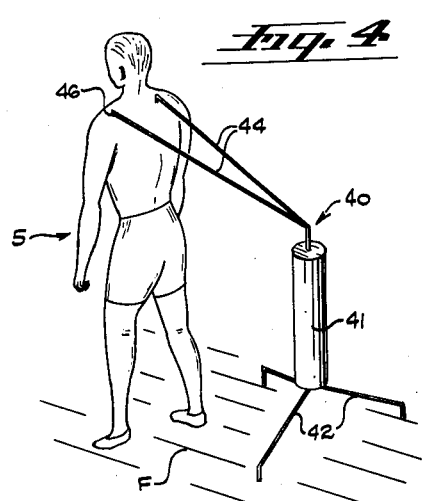
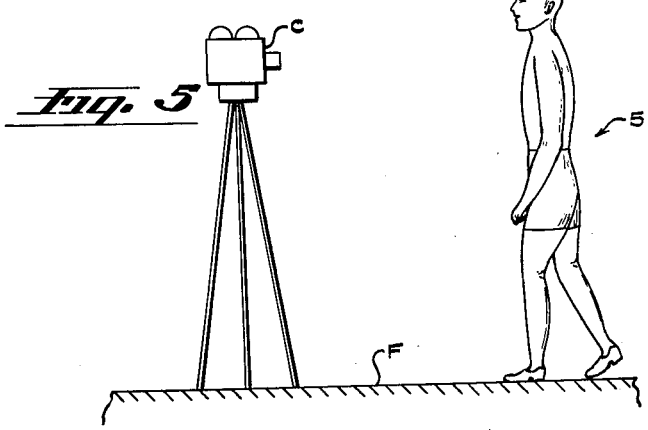
EDWARD NASSOUR
INVENTOR
BY Nesoy O'Graham
ATTORNEYS

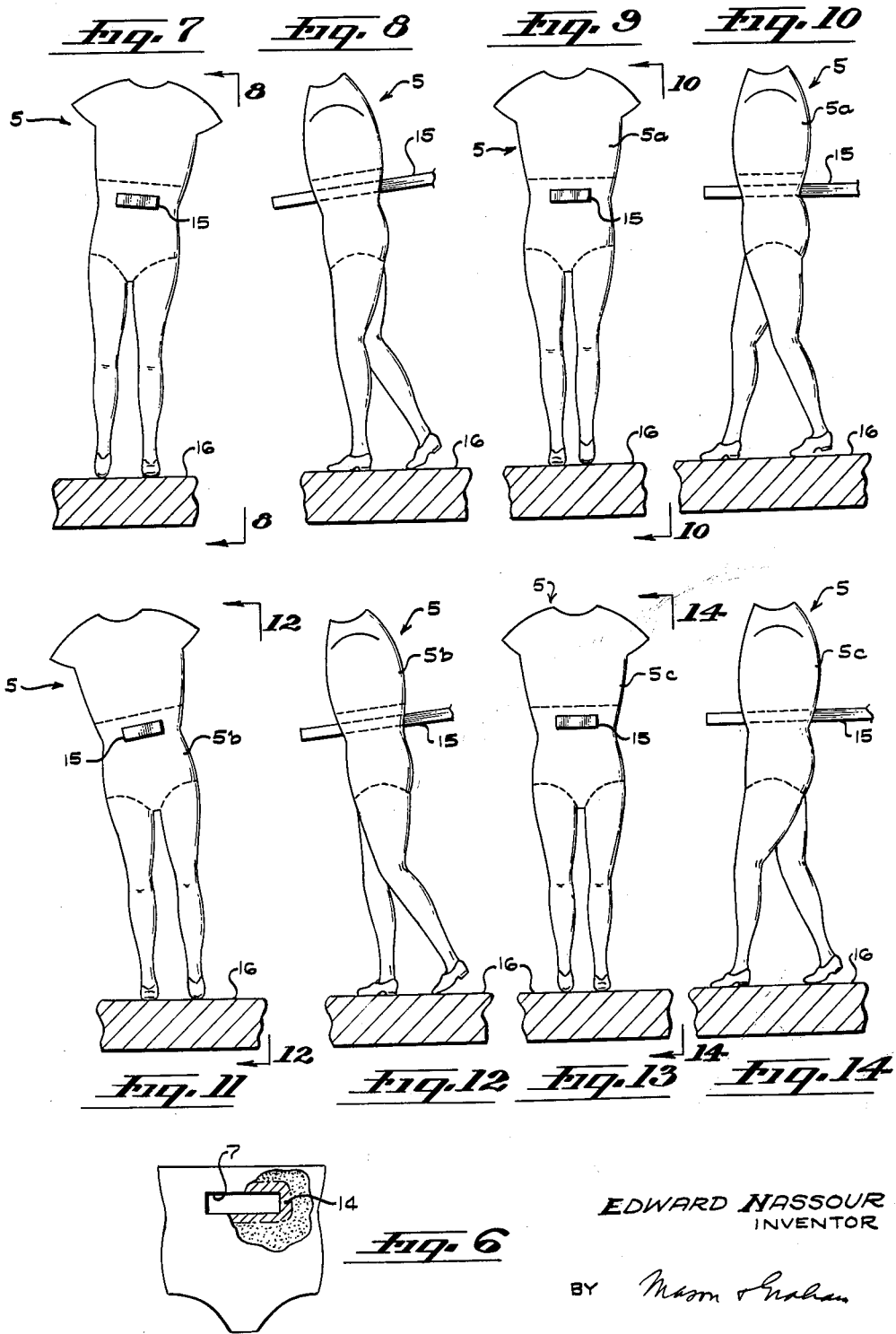

United States Patent Office 3,073,053
Patented Jan. 15, 1963

3,073,053
METHOD OF AND MEANS FOR MAKING PLASTIC FIGURES HAVING DIFFERENT POSTURES OF ANIMATION
Edward Nassour, 8460 W. 3rd St., Los Angeles, Calif.
Filed Aug. 17, 1959, Ser. No. 834,105
5 Claims. (Cl. 41—25)

This invention has to do with making figures to be photographed in different animated postures for the purpose of producing a motion picture. In its more particular aspects, my invention relates to means for and method of producing a plurality of figures which are duplicates of each other except that different parts of the figures to be animated are formed in relatively different postures.

In the making of motion pictures by successively photographing animated figures in relatively different positions of animation, it has been the practice to form the figures in a mold and, while the material of which the figures are cast is still in a plastic or pliant state, localized portions of the respective figures are formed into the desired postures in which the figures are successively to be photographed. The difficulty which has been experienced in the art has been that the cast figures must be allowed to remain in the molds until they are sufficiently hardened to enable them to be handled, and therefore they do not remain in a plastic or pliant state long enough after being removed from the molds to permit the proper amount of time to be spent in normally reshaping them before they become too hard to work.

Another objection to present practice is that no particularly efficient means have been provided for supporting the figures in such positions that the successive postures of animation can be accurately coordinated.

It is therefore an object of my present invention to provide means for and methods of producing such figures in such manner that the animating thereof may be commenced as soon as the figures are removed from the casting molds, thus allowing a substantially greater period of time within which to carry out the operations of manually changing the postures of different portions of the figures preparatory to their being successively photographed.

Another object is to provide, in such means and methods, means for supporting the figures, while they are being animated, in positioned accurately correlated to each other or to a base or surface upon which they are to be photographed.

A further object is to provide, in such means and method, novel means providing an opening through a figure as soon as it is removed from a casting mold, for the purpose of enabling the figure to be slideably mounted on a support while the figure is being animated, and for permanently hardening only that portion of the body of the figure which immediately surrounds the formed opening.

Other objects and corresponding advantages will appear hereinafter.

For the purpose of explaining to those skilled in the art how to practice my invention, I shall now describe a presently preferred embodiment thereof, for which purpose I shall refer to the accompanying drawing, wherein:

FIG. 1 is a perspective view showing my device for forming an opening through the figure and permanently hardening the material of the figure immediately around the formed opening;

FIG. 2 is a perspective view showing my means for supporting a figure or figures while the posture of different portions thereof is being altered;

FIG. 3 is a front elevation of one of the figures having the head and arm portions attached;

FIG. 4 is a perspective view showing my means for supporting a figure while it is being photographed;

FIG. 5 is a side elevational view illustrating the photographing of a figure;

FIG. 6 is an enlarged fragmentary view of the body portion of a figure; and

FIGS. 7–8, 9–10, 11–12, 13–14 are elevational views illustrating steps in the animation of the figures.

Referring now to the drawing, I show, in FIG. 7, a figure 5 which is one of a series of figures each simulating a man. The figures are preferably made of conventional modeling clay, well known in the art. Usually, when the figures are removed from the casting molds they are too soft to handle without breaking or otherwise objectionably deforming them. To prepare the figures for immediate handling as soon as they are removed from the molds, I form a transverse hole or opening 7 through the waist portion of the figure and preliminarily or partly harden the material immediately around the opening.

As a means for forming the opening 7, I employ a metal bar 8 of angular cross section, supported by an upright 9 from a base 10. The bar 8 is electrically heated by a conventional electrical heating coil, not shown, mounted within a handle 11 conductively connected by wires 12 to an electrical source not shown. The waist portion of the figure 5 is manually forced over the outer end of the bar 8 so that the bar pierces through the body and forms the opening 7 therein of angular cross section. The angular or rectangular cross-section of the bar 8 and the like cross-sectional shape of the hole 7 prevents the figure from rotating relative to the bar. As the hole is thus formed, the heat of the bar preliminarily hardens the material of the body of the figure within the area immediately surrounding the opening 7, said preliminarily hardened portion being denoted 14 in FIG. 6.

While each figure is being shaped to the posture which portions of it must have to depict a step in a walking cycle, for instance, it is mounted on a supporting arm 15 of a support member S. The support member S comprises a base 16 carrying an upright 17 of rectangular cross-section. A support block 18 has an opening 18a to slideably adjustably pass the upright 17, a set screw 19 being threaded into the block 18 to secure the latter in position of vertical adjustment on the upright. A boss 20 is secured, as by welding, to a side surface of the block 18, and an arm-carrying member 21 is rotatably mounted on a spindle 22 carried by boss 20, a thumb-nut 23 being threaded onto the threaded outer end of the spindle to secure the member 21 in any position of rotative adjustment relative to the boss. A tube 24 is fixed, as by welding, to the member 21 and projects radially therefrom to rotatively receive the rounded inner end of the supporting arm 15. A set screw 25 is threaded radially through the tube 24 to engage the inner end portion of the supporting arm 15 and retain it in any desired position of rotative adjustment relative to the tube. The contacting portions of member 21 and the boss present interengaging teeth 26 to insure positive retention of those parts in relative adjustment. Thus the support member S may be vertically adjusted relative to the base, and the arm 15 may be tilted in a vertical plane and also may be adjustably rotated about its longitudinal axis. The top of the base corresponds to the surface upon which the figure is eventually to be photographed after being removed from the support S.

For instance, in FIGS. 7-8 the arm 15 is shown in position rotated slightly about its longitudinal axis and tilted downwardly so as to support the FIGURE 5 in position leaning slightly to one side as well as slightly forwardly, which would be its position in taking a forward step. While the figure is thus supported, an operator manually reshapes the body and leg portions of the figure into the desired posture corresponding to that step of a walking cycle.

While it is my preference to employ one of the supports S for each figure of a series, so that the figure may remain in its supported and formed position until it hardens, it will be understood that I may use a single support S for all of a sequence of figures and remove each figure therefrom after it is formed. Also I may attach the head and arm portions to the figure before or after it is removed from the support.

In FIGS. 9 and 10 I show the arm 15 in the position into which it would be adjusted to support a next sequential figure 5a for the next step of a walking cycle. That is, the arm is shown in horizontal position. While the figure is supported in that position, the operator manually forms the body and leg portions to have the desired posture for that step of the walking cycle.

In FIGS. 11 and 12 the arm 15 is shown in the position into which it would be adjusted to support the next sequential figure 5b for the next step of a walking cycle. That is, the arm is slightly rotated in a direction reverse to that shown in FIGS. 7 and 8 and is tilted downwardly. While the figure 5b is supported in that position, the body and leg portions are manually reshaped to have the desired postures depicting that step of a walking cycle.

In FIGS. 13-14, the arm 15 is shown in the position into which it would be adjusted to support the next sequential figure 5c for the next step of a walking cycle. That is, the arm is horizontal. While the figure is thus supported, the body and leg portions of the figure are manually formed into the desired posture.

Thus, in FIGS. 7-14, I have shown figures depicting two complete forward steps, which would be duplicated for lengthening the walking cycle. Postures in which I have illustrated the figures are intended only as typical since each artist would decide upon the postures preferred.

After the figures thus formed have hardened, they are removed from their respective supporting arms 15, and, if the head and arm portions of the figures have not been previously attached to the figures, they are then attached and the various figures are then in condition to be sequentially photographed upon a floor surface F as shown in FIG. 5 after the holes 7 have been filled by a filling 39 of plastic material.

For the purpose of supporting each figure uprightly on a surface F while being photographed, I provide the figure supporting device 40 shown in FIG. 4, which comprises a body 41 having legs 42 and carrying at its top end a pair of outwardly diverging arms 44 each of which has a right angularly disposed end extension 46. The extensions 46 slightly penetrate the shoulder portions of the supported figure while the legs 42 rest upon the surface F, so that the figure is supported uprightly and in the appropriate posture upon the surface F.

To be assured that, during photographing, the figure will be supported by the device 40 in precisely the same position it occupied while it was carried by the support arm 15, it is my preference, while the figure is still supported on the arm, to place the member 40 behind the figure and cause the extensions 46 to pierce and form properly located recesses in the figure. Consequently, when the support 40 is applied to the figure after the figure is removed from the arm 15, the figure will be supported in precisely the same position it occupied while it was supported on the arm 15.

I claim:

1. In the art of providing inanimate plastic figures with different postures of animation, the method which comprises the steps of providing soft pliant plastic figures, piercing a transverse hole through each of said figures, applying heat to each of said figures only in the portion thereof immediately circumscribing said hole until the material of said portion becomes preliminarily hardened, supporting each of said figures uprightly by passing a support through the said hole therein, manually reshaping a portion of each of said figures to the desired posture of animation while said figures are so supported, and finally hardening said figures.

2. In the art of providing inanimate plastic figures with different postures of animation, the method which includes providing an unhardened plastic figure to be animated, forming a hole transversely through said figure, applying heat only to that portion of said figure which immediately circumscribes said hole until said portion becomes substantially hardened, and then supporting said figure on a support member extending through and conforming to said hole while manually reshaping said figure into the desired position of animation.

3. In the art of providing inanimate figures with different postures of animation, the method which comprises producing a plurality of soft, pliant, plastic figures, piercing a hole transversely through each of said figures while it is soft and pliant, subjecting a portion of said figure only immediately circumscribing said hole to heat until said portion becomes substantially hardened, supporting said figure by a support member extending through said hole, manually reshaping said figure to the desired posture of animation while it is so supported, and then hardening the remainder of said figure.

4. The method of claim 3 wherein said pierced hole and said support member are of conforming, angular cross section.

5. In the art of providing inanimate plastic figures wiht different postures of animation, the combination including a soft, pliant, plastic figure having a hole extending transversely therethrough, the portion of said figure only immediately circumscribing said hole being relatively hardened, means supporting said figure to enable it to be manually reshaped comprising a base, an upright member carried by and extending perpendicularly to said base, an arm having a cross sectional shape conforming to and engaging in said hole, and means for securing said arm to said upright member for rotative adjustment relative thereto and for swinging movement relative to said base.

References Cited in the file of this patent

UNITED STATES PATENTS

| | | |
|---|---|---|
| 1,755,775 | Dunn | Apr. 22, 1930 |
| 2,121,957 | Fleischli et al. | June 28, 1938 |
| 2,273,185 | Engler et al. | Feb. 17, 1942 |
| 2,343,238 | Manning et al. | Mar. 7, 1944 |
| 2,422,325 | Wheelon | June 17, 1947 |
| 2,545,210 | Moore | Mar. 13, 1951 |
| 2,684,503 | Silver | July 27, 1954 |
| 2,686,556 | Gerber et al. | Aug. 17, 1954 |
| 2,743,763 | Westerkamp | May 1, 1956 |
| 2,830,649 | Westerkamp | Apr. 15, 1958 |